United States Patent
Mironets et al.

(10) Patent No.: US 10,626,883 B2
(45) Date of Patent: Apr. 21, 2020

(54) SYSTEMS AND METHODS FOR MAKING BLADE SHEATHS

(71) Applicant: Hamilton Sundstrand Corporation, Charlotte, NC (US)

(72) Inventors: Sergey Mironets, Charlotte, NC (US); Daniel Ursenbach, Caledonia, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 381 days.

(21) Appl. No.: 15/374,676

(22) Filed: Dec. 9, 2016

(65) Prior Publication Data

US 2018/0163744 A1  Jun. 14, 2018

(51) Int. Cl.
*F01D 5/14* (2006.01)
*F04D 29/38* (2006.01)
(Continued)

(52) U.S. Cl.
CPC .......... *F04D 29/388* (2013.01); *B22F 3/1055* (2013.01); *B22F 5/04* (2013.01); *B22F 7/062* (2013.01); *B23K 9/044* (2013.01); *B23K 15/0086* (2013.01); *B23K 26/342* (2015.10); *B23P 15/04* (2013.01); *B33Y 80/00* (2014.12); *F01D 5/147* (2013.01); *F01D 5/286* (2013.01); *F04D 29/023* (2013.01); *F04D 29/324* (2013.01); *F04D 29/325* (2013.01);
(Continued)

(58) Field of Classification Search
CPC .... F04D 29/388; F04D 29/324; F04D 29/023; F04D 29/325; B22F 7/062; B22F 3/1055; B22F 5/04; B33Y 80/00; F01D 5/286; F01D 5/147; B23P 15/04; B23K 15/0086; B23K 2101/001; B23K 2103/14; B23K 9/044; B23K 26/342; F05D 2240/303; F05D 2300/133; F05D 2300/171; F05D 2220/36; F05D 2300/121; F05D 2230/31; Y02P 10/295; F02K 3/06

See application file for complete search history.

(56) References Cited

U.S. PATENT DOCUMENTS 6,190,740 B1 * 2/2001 Rogers .................... C23C 4/131
427/446
8,240,046 B2   8/2012 Peretti et al.
(Continued)

FOREIGN PATENT DOCUMENTS

EP          2362067        8/2011

OTHER PUBLICATIONS

European Patent Office, European Search Report dated May 16, 2018 in Application No. 17206441.2-1016.

*Primary Examiner* — Jun S Yoo
(74) *Attorney, Agent, or Firm* — Snell & Wilmer, L.L.P.

(57) ABSTRACT

A method of making a sheath for an airfoil may include the steps of forming an upper sleeve and a lower sleeve, and forming a central portion bonded to the upper sleeve and the lower sleeve. The central portion may be formed by depositing a material on the upper sleeve and the lower sleeve. A portion of the material may be removed from at least one of the central portion, the upper sleeve, or the lower sleeve. The sheath may include a first flank, a central portion bonded to the first flank, and a second flank bonded to the central portion. The central portion may have a substantially uniform microstructure resulting from additive manufacturing.

8 Claims, 6 Drawing Sheets

(51) Int. Cl.

| | |
|---|---|
| *B23K 26/342* | (2014.01) |
| *B23K 9/04* | (2006.01) |
| *B22F 5/04* | (2006.01) |
| *B23P 15/04* | (2006.01) |
| *F04D 29/02* | (2006.01) |
| *B23K 15/00* | (2006.01) |
| *B22F 7/06* | (2006.01) |
| *F04D 29/32* | (2006.01) |
| *B33Y 80/00* | (2015.01) |
| *B22F 3/105* | (2006.01) |
| *F01D 5/28* | (2006.01) |
| *B23K 101/00* | (2006.01) |
| *B23K 103/14* | (2006.01) |
| *F02K 3/06* | (2006.01) |

(52) U.S. Cl.
CPC .... *B23K 2101/001* (2018.08); *B23K 2103/14* (2018.08); *F02K 3/06* (2013.01); *F05D 2220/36* (2013.01); *F05D 2230/31* (2013.01); *F05D 2240/303* (2013.01); *F05D 2300/121* (2013.01); *F05D 2300/133* (2013.01); *F05D 2300/171* (2013.01); *Y02P 10/295* (2015.11)

(56) References Cited

U.S. PATENT DOCUMENTS

| | | |
|---|---|---|
| 9,140,130 B2 | 9/2015 | Mironets et al. |
| 9,279,328 B2 | 3/2016 | Roy et al. |
| 2011/0097213 A1 | 4/2011 | Peretti |
| 2011/0129351 A1 | 6/2011 | Das et al. |
| 2012/0114494 A1 | 5/2012 | Ford |
| 2012/0233859 A1 | 9/2012 | Cattiez |
| 2013/0101423 A1* | 4/2013 | Roy ........................ F01D 5/147 416/223 R |
| 2013/0199934 A1 | 8/2013 | Parkos, Jr. et al. |
| 2013/0236323 A1* | 9/2013 | Mironets ................. F01D 5/286 416/229 R |
| 2015/0093287 A1* | 4/2015 | Pederson .................. C23C 4/04 420/417 |
| 2015/0298791 A1* | 10/2015 | Nordin ...................... B64C 3/28 244/45 R |

\* cited by examiner

SYSTEMS AND METHODS FOR MAKING BLADE SHEATHS

FIELD

The disclosure relates generally to sheaths for airfoils in gas turbine engines.

BACKGROUND

Fans are complex rotating systems that may encounter undesirable conditions during normal operation. Fans may be subject to debris entering an engine inlet. The debris may contact the blades of the fan at the leading edge, causing damage. Blade sheaths may protect the leading edge of fan blades. The blade sheaths are often made using costly techniques and/or techniques that may leave microstructural anomalies.

Blade sheaths are typically produced using subtractive methods such as milling and machining techniques. These techniques typically have a high cost, low productivity rates, and long lead times. Many other subtractive methods considered for blade sheaths are limited in dimensional accuracy, surface finish, material integrity, and throughput.

SUMMARY

A method of making a sheath for an airfoil is provided. The method includes the steps of forming an upper sleeve and a lower sleeve, and forming a central portion bonded to the upper sleeve and the lower sleeve. The central portion may be formed by depositing a material on the upper sleeve and the lower sleeve. A portion of the material may be removed from at least one of the central portion, the upper sleeve, or the lower sleeve.

In various embodiments, the material may be deposited using wire arc additive manufacturing. The upper sleeve may be fixed relative to the lower sleeve prior to forming the central portion. The upper sleeve and the lower sleeve may also be formed from a sheet metal. The central portion may be formed by applying a heat source to a wire comprising titanium. The lower sleeve and the upper sleeve may be made of titanium, aluminum, nickel, steel, and/or their alloys. The sheath may be bonded to the airfoil with an adhesive. An internal surface of the central portion may be formed having a curved geometry, and the internal surface may joins the upper sleeve and the lower sleeve. A protective coating may be formed on the internal surface.

A sheath for an airfoil is also provided. The sheath may include a first flank, a central portion bonded to the first flank, and a second flank bonded to the central portion. The central portion may be deposited using additive manufacturing.

In various embodiments, the central portion has a substantially uniform microstructure as a result of additive manufacturing. The first flank and/or second flank may be formed from a sheet of a metal including titanium, aluminum, nickel, and/or steel. The central portion may be formed from a titanium alloy. An inner surface may be formed with a curved surface to join the first flank and the second flank. The inner surface may be substantially smooth with a substantially uniform microstructure.

A fan for a gas turbine engine is also provided. The fan may include a blade having a leading edge, a pressure side, a suction side, and a trailing edge. A sheath may be bonded to the blade by an adhesive. The sheath may have a first flank on the pressure side, a second flank on the suction side, and a central portion joining the first flank and the second flank. The central portion may have a substantially uniform microstructure.

In various embodiments, the central portion may be formed by applying a heat source to a wire to deposit material on the first flank and the second flank. The sheath may comprise at least one of titanium, aluminum, nickel, or steel. An inner surface of the central portion that joins the first flank and the second flank may be substantially smooth.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
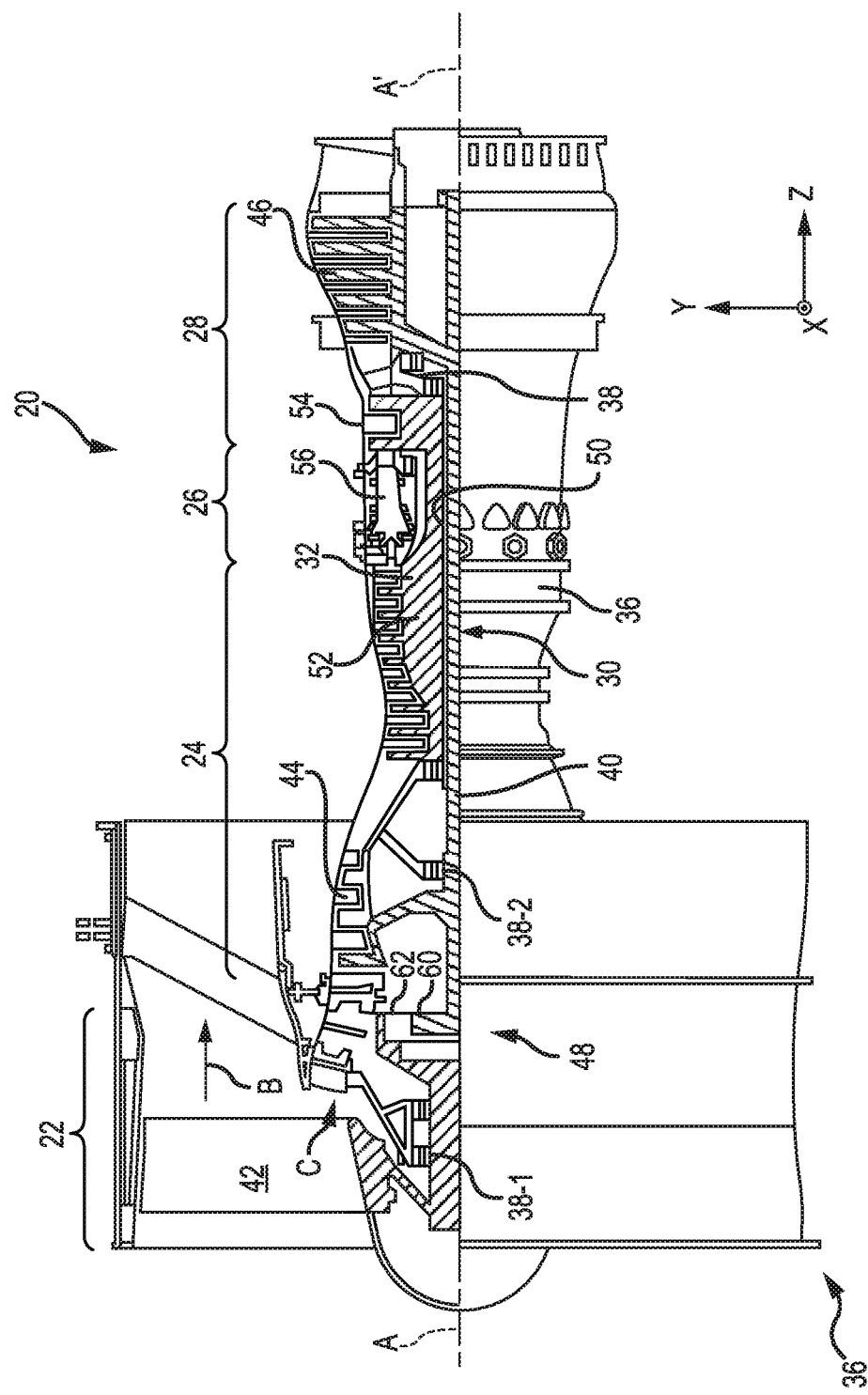
FIG. 1 illustrates an example of a gas turbine engine, in accordance with various embodiments.

Referring now to FIG. 1, an exemplary gas turbine engine 20 is shown, in accordance with various embodiments. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive fluid (e.g., air) along a bypass-flow path B while compressor section 24 can drive coolant along a core-flow path C for compression and communication into combustor section 26 then expansion through turbine section 28. Although depicted as a two-spool turbofan gas turbine engine 20 herein, it should be understood that the concepts described herein are not limited to use with two-spool turbofans as the teachings may be applied to other types of turbine engines including turbojet, turboprop, turboshaft, or power generation turbines, with or without geared fan, geared compressor or three-spool architectures.

Gas turbine engine 20 may generally comprise a low speed spool 30 and a high speed spool 32 mounted for rotation about an engine central longitudinal axis A-A' relative to an engine static structure 36 via several bearing systems 38, 38-1, and 38-2. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low-pressure compressor 44 and a low-pressure turbine 46. Inner shaft 40 may be connected to fan 42 through a geared architecture 48 that can drive fan 42 at a lower speed than low speed spool 30. Fan 42 (or other rotating sections having airfoils such as compressor section 24 or turbine section 28) may include a protective sheath along the leading edge of the airfoils. Geared architecture 48 may comprise a gear assembly enclosed within a gear housing that couples inner shaft 40 to a rotating fan structure. High speed spool 32 may comprise an outer shaft 50 that interconnects a high-pressure compressor 52 and high-pressure turbine 54. Airfoils 55 coupled to a rotor of high-pressure turbine may rotate about the engine central longitudinal axis A-A' or airfoils 55 coupled to a stator may be rotationally fixed about engine central longitudinal axis A-A'.

A combustor 56 may be located between high-pressure compressor 52 and high-pressure turbine 54. Inner shaft 40 and outer shaft 50 may be concentric and rotate via bearing systems 38 about the engine central longitudinal axis A-A', which is collinear with their longitudinal axes. As used herein, a "high-pressure" compressor or turbine experiences a higher pressure than a corresponding "low-pressure" compressor or turbine.

The core airflow along core-flow path C may be compressed by low-pressure compressor 44 then high-pressure compressor 52, mixed and burned with fuel in combustor 56, then expanded over high-pressure turbine 54 and low-pressure turbine 46. Turbines 46, 54 rotationally drive the respective low speed spool 30 and high speed spool 32 in response to the expansion.

Figure 2A:
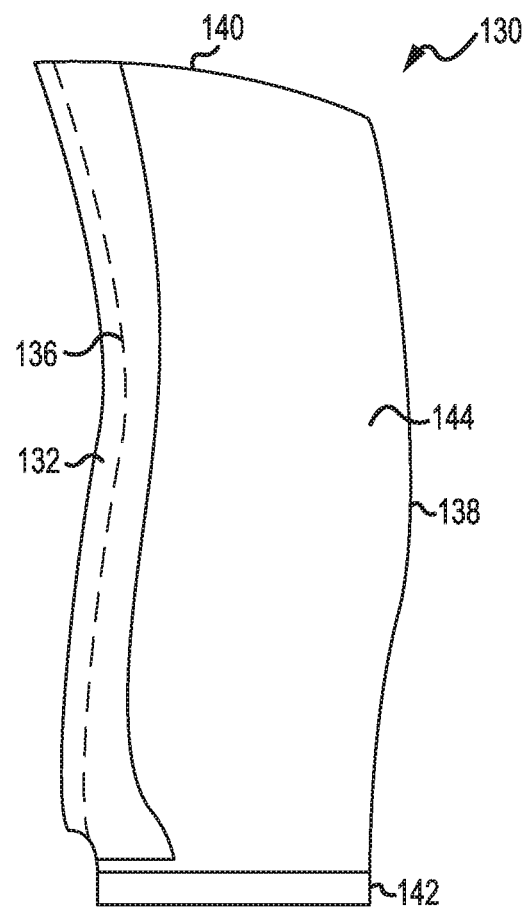
FIG. 2A illustrates an elevation view of a blade having a sheath coupled to the blade, in accordance with various embodiments.
Figure 2B:
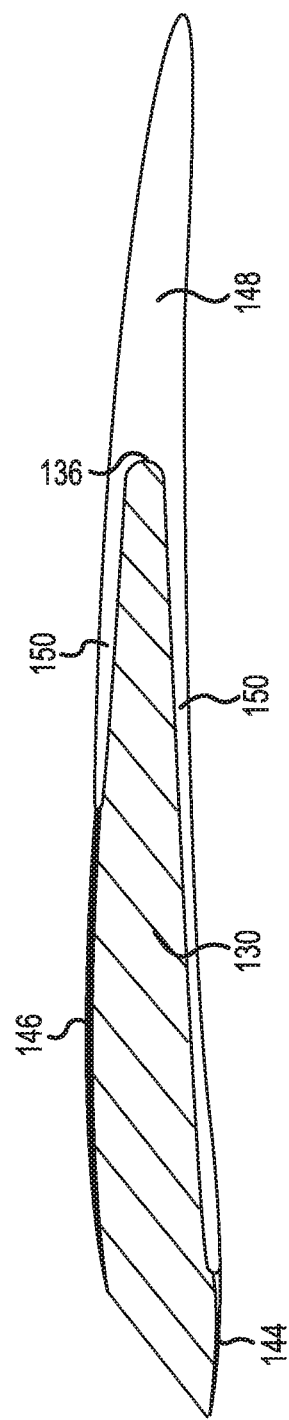
FIG. 2B illustrates a cross-sectional view of a blade with a sheath as viewed from top to bottom, in accordance with various embodiments.
Figure 2C:
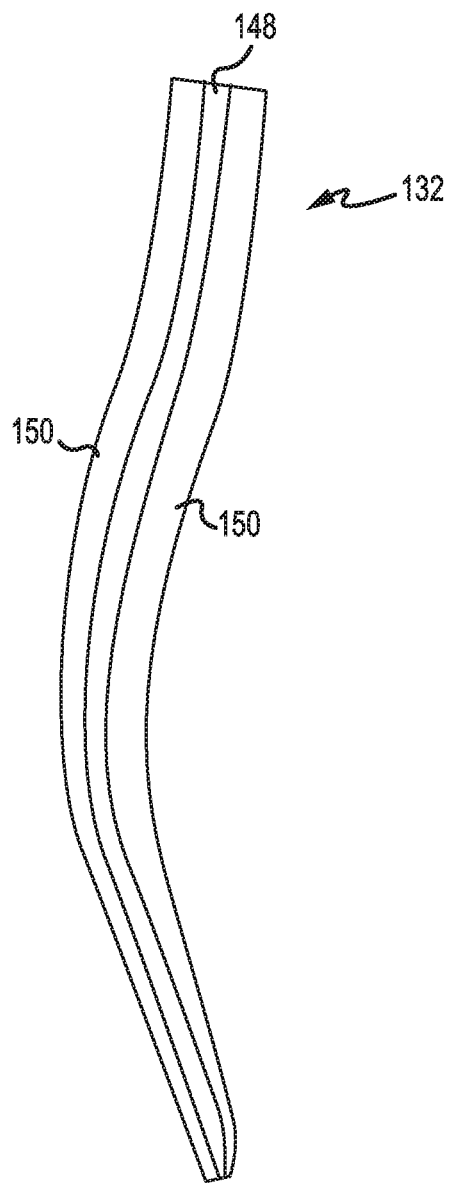
FIG. 2C illustrates a front view of a sheath for a blade, in accordance with various embodiments.

With reference to FIGS. 2A, 2B, and 2C, blade 130 with sheath 132 is shown according to various embodiments. Blade 130 may be a blade of fan 42 of FIG. 1, for example, and may also be referred to as an airfoil. Blade 130 with leading edge 136, trailing edge 138, tip 140, root 142, suction side 144 and pressure side 146, and sheath 132. Sheath 132 includes solid portion 148 covering leading edge 136 with and tapered flanks 150 extending from each side of solid portion 148 to cover at least a portion of suction side 144 and pressure side 146.

In various embodiments, sheath 132 covers leading edge 136 of blade 130 with solid portion 148 by adhesively bonding the tapered flanks 150 to suction side 144 and pressure side 146 of blade 130 with a scrim sheet between sheath 132 and blade 130. Tapered flanks 150 can be bonded to suction side 144 and pressure side 146 with various adhesives including, but not limited to, rubber, synthetic rubber, silicone or epoxy resin. A scrim sheet can be a thin textile which provides a separation between the different materials of sheath 132 and blade 130, protecting blade 130 from its susceptibility to galvanic corrosion where sheath 132 is bonded to blade 130.

Sheath 132 can be made of titanium, aluminum, nickel, or steel (including alloys of any) or other materials with sufficient stiffness, strength and erosion resistance to withstand the impact loads, static and fatigue loads, or particulate and rain erosion that may be experienced on the leading edge of an airfoil. The length of solid portion 148 (extending out from leading edge 136 and from tip 140) can vary widely, but may be sufficiently long to provide protection for leading edge 136 of blade 130. The length of tapered flanks 150 can be varied on each side of blade 130 depending on various design considerations of blade 130 and sheath 132. In the example shown, tapered flank 150 on pressure side extends further in the chord-wise direction to provide extra large scale impact protection such as a bird strike, for example, in portions of blade 130 where blade 130 is vulnerable to impacts.

Sheath 132 provides extra strength and stiffness to blade 130, allowing blade 130 to be made of lightweight materials. Solid portion 148 of sheath 132 provides a layer of protection from impact loads as well as erosion for leading edge 136 of airfoil. Tapered flanks 150 bond the solid portion 148 to airfoil to hold the solid portion 148 in place. Additionally, leading edge 136 of solid portion 148 can be coated with a thin layer of erosion resistant coating to provide increased erosion resistance. This coating may be a cermet, for example, WC or $Cr_2C_2$ containing material, or a harder metallic material such as nick or cobalt based hard alloys. Other coating materials may also be suitable for surfaces of sheath 132. Tapered flanks 150 may further provide stiffness to blade 130 as well as surface area for a smooth load transfer during impacts to blade 130.

Figure 3A:
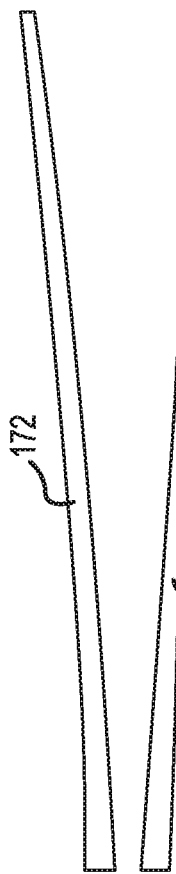
FIG. 3A illustrates a disconnected suction side flank and pressure side flank of a sheath for a blade, in accordance with various embodiments.
Figure 3B:
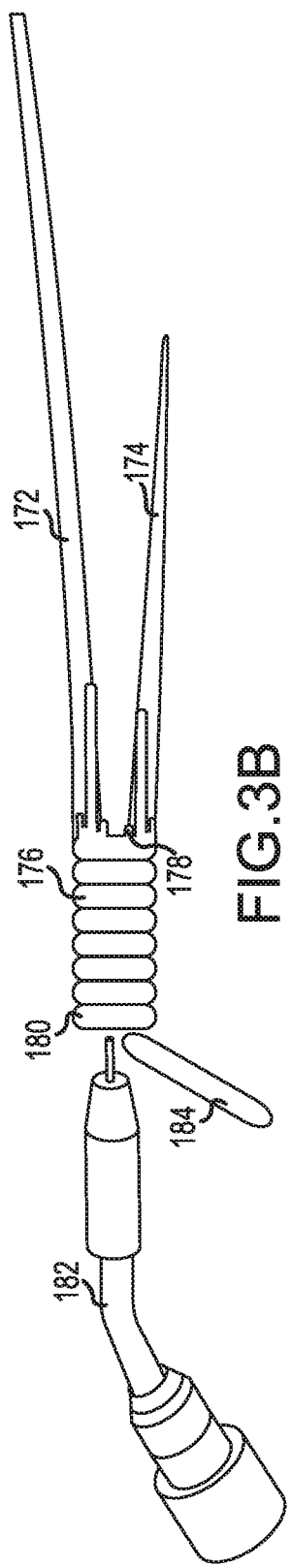
FIG. 3B illustrates flanks of a sheath joined by a central portion formed by additive manufacturing, in accordance with various embodiments.
Figure 3C:
FIG. 3C illustrates a finished sheath with a central portion deposited by additive manufacturing to join flanks of the sheath, in accordance with various embodiments.

FIGS. 3A, 3B, and 3C illustrate the process of making a sheath 170 using additive manufacturing, in accordance with various embodiments. In FIG. 3A, upper sleeve 172 and lower sleeve 174 are formed separately. Although the terms upper sleeve and lower sleeve are used with reference to the cross-sectional view of FIG. 3A to distinguish the two sleeves, no specific orientation is meant to be implied by the labels upper and lower. Upper sleeve 172 and lower sleeve 174 may be formed in a shape similar to tapered flanks 150 described above. Upper sleeve 172 and lower sleeve 174 may be formed from a metallic material. Upper sleeve and lower sleeve may be formed from titanium, aluminum, nickel, steel, alloys thereof, or other metallic materials. Upper sleeve 172 and lower sleeve 174 may be formed of the same material, or of different materials in various embodiments. For example, upper sleeve 172 and lower sleeve 174 may be formed from sheet metal comprising titanium alloy. Upper sleeve 172 and lower sleeve 174 may be long sheets of material that have a contour matching a blade 130 (of FIG. 2A) along the pressure side or suction side.

Upper sleeve 172 and lower sleeve 174 may be formed using various techniques including hot forming, rolling, machining, sheet metal, extrusion, and/or additive manufacturing. Upper sleeve 172 and lower sleeve 174 may be formed as completely disconnected sleeves and later connected. Upper sleeve 172 and lower sleeve 174 may also be formed as partially connected or connected sleeves suitable for deposition of a central leading edge.

In FIG. 3B, additive manufacturing technology is used to join the upper sleeve 172 and lower sleeve 174 by building a central portion 176. Upper sleeve 172 and lower sleeve 174 may be clamped to a mandrel or other mechanical device, for example, to hold or fix the sleeves in position relative to one another. In various embodiments, wire arc additive manufacturing (WAAM) may be used to build central portion 176. To use WAAM, an electric arc such as a tungsten inert gas (TIG) or metal inert gas (MIG) source, for example, may be used as heat source 182. A wire 184 as may be used as feedstock. WAAM may further include using welding power sources, torches, and/or wire feeding systems to deposit material from wire 184 onto a workpiece such as central portion 176, for example. Upper sleeve 172 and/or lower sleeve 174 may be micro-roughened prior to deposition of central portion 176 to improve bonding characteristics.

The WAAM process may use arc control systems to robotically deposit material. In response to wire threading, wire 184 may be fed in the direction of the central portion 176 and make contact. The control system may detect wire 184 in contact with central portion 176 and retract the wire until it wire 184 at a desired ignition distance from the central portion 176. Motion may be provided by robotic systems to position wire 184 at the desired location relative to central portion 176 and apply the heat source to the wire. Central portion 176 may include a bond line 178 where central portion 176 is deposited on and bonded to upper sleeve 172 and lower sleeve 174. Central portion 176 may also include rough surfaces 180 in an unfinished form.

In FIG. 3C, a post build thermo-mechanical treatment and/or final machining is performed on sheath 170. Sheath 170 may be shaped into its final dimensions using machining to remove material, though other techniques may also be used. A thickness $T_1$ of upper sleeve 172 at a distal end may be approximately 0.040 inches (1.02 mm). The term approximately as used with dimensions is meant to mean a variety of possible ranges including +/−5%, +/−10%, +/−15%, or +/−20, for example. Lower sleeve 174 may be generally thinner than upper sleeve 172. Lower sleeve 174 may have a thickness $T_2$ at a distal end of approximately 0.020 inches (0.51 mm). The thickness of lower sleeve 174 and upper sleeve 172 may increase with proximity to central portion 176. Lower sleeve 174 and upper sleeve 172 may form the tapered flanks 150 (of FIG. 2A). Central portion 176 may have a thickness $T_3$ of approximately 1-2 inches. Internal surface 188 of joining the upper sleeve 172 and lower sleeve 174 may be a curved surface. The curve may be radial or multi-radial, hyperbolic, or any other suitable curve. For example, internal surface 188 may have a radius of curvature of approximately 0.040 inches (1.02 mm). Outer surface 190 and internal surface 188 may be finished into smooth surfaces and treated with optional protective coatings to reduce corrosion and/or improve ware characteristics. Inner portion 192 of central portion 176 may be formed deposited material with a uniform microstructure.

Figure 4B:
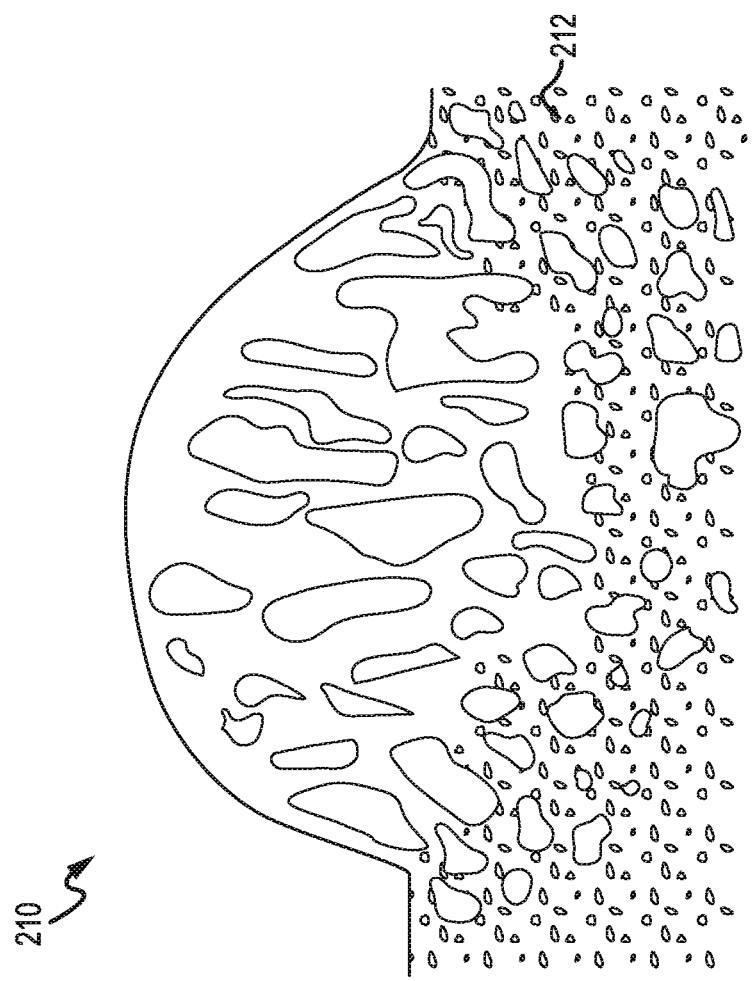
FIG. 4B illustrates a granular microstructure of a sheath made using additive manufacturing, in accordance with various embodiments.
Figure 4A:
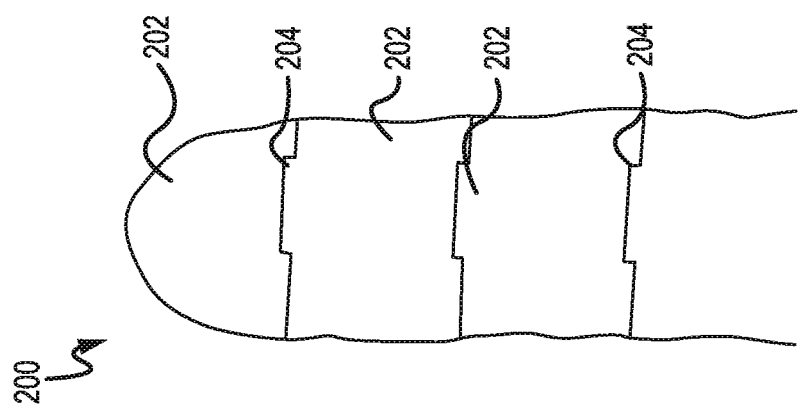
FIG. 4A illustrates a layered microstructure of a central portion of a sheath deposited by additive manufacturing, in accordance with various embodiments.

With reference to FIGS. 4A and 4B, a microstructure of a sheath 132 (of FIG. 2A) formed using additive manufacturing is shown, in accordance with various embodiments. Sheaths formed using the additive manufacturing as described herein may also improve quality by eliminating microstructure flaws generated by traditional techniques, such as forming internal folds and crack at internal surface 188 (of FIG. 3C). Microstructure 200 of FIG. 4A illustrates various layers 202 with bond lines 204 where each layer of material was deposited using additive manufacturing. Microstructure 200 illustrates a multi-layer titanium alloy wall built using WAAM. FIG. 4B illustrates a substantially uniform microstructure 210 of a titanium deposit 212. The microstructures of FIGS. 4A and 4B are substantially uniform and may have improved strength characteristics compared to less uniform microstructures. A substantially uniform microstructure may also lack folds and cracks associated with various manufacturing technologies.

Components made using WAAM may include a grain structure grown in the direction of material being added. The surfaces of a sheath made with additive manufacturing may thus be smooth. The sheaths may have internal structural details that cannot be machined into the components due to lack of access such as, for example, internal surface 188 of FIG. 3C.

Surfaces made using WAAM, EBAM, or similar weld-like techniques may deposit material in a series of cylindrical layers formed one on top of another. A wall formed by the techniques may thus have varying width corresponding to the cylindrical profile of each layer. The strength of the wall, however, may be limited by the thin portions of the wall. Thus, the excess material may be removed from each layer during the deposition process or after the deposition process. In that regard, forming a sheath of the present disclosure using WAAM and/or EBAM manufacturing may also include depositing a layer of material, removing excess material from the layer to give the layer a substantially smooth surface, depositing another layer of the layer of uniform width, and removing the excess material from the second layer to give the second layer a substantially smooth surface. This process may be continued throughout the build of the entire sheath. In various embodiments of the build process, several layers of material could be deposited, followed by a clean-up process which would remove excess material from the entire wall surface, creating a wall with a substantially smooth surface.

In various embodiments, sheaths of the present disclosure formed using additive manufacturing may be formed with greater productivity rates. For example, the WAAM build rate may be 3 time higher than laser powder deposition. The additive manufacturing techniques described herein may reduce the cost associated with sheath production by eliminating costly hot forming operations and greatly reducing machining of external surfaces.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment, for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiment Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of making a sheath for an airfoil, comprising:
   forming an upper sleeve having a contour matching a suction side of the airfoil;
   forming a lower sleeve having a contour matching a pressure side of the airfoil;
   micro-roughening a leading edge of the upper sleeve and a leading edge of the lower sleeve;
   forming a central portion bonded to the leading edge of the upper sleeve and the leading edge of the lower sleeve by depositing a first layer of titanium material of uniform width on the leading edge of the upper sleeve and the leading edge of the lower sleeve using a tungsten inert gas (TIG) source, removing excess material from the first layer to give the first layer a substantially smooth surface, and depositing a second layer of titanium material of uniform width on the first layer.

2. The method of claim 1, further comprising fixing the upper sleeve relative to the lower sleeve prior to forming the central portion.

3. The method of claim 1, wherein the upper sleeve and the lower sleeve are formed from a sheet metal.

4. The method of claim 1, wherein the central portion is formed by applying a heat source to a wire comprising titanium.

5. The method of claim 1, wherein the lower sleeve and the upper sleeve comprise at least one of titanium, aluminum, nickel, or steel.

6. The method of claim 1, further comprising bonding the sheath to the airfoil with an adhesive.

7. The method of claim 1, wherein the removing the portion of the material includes forming an internal surface of the central portion having a curved geometry, wherein the internal surface joins the upper sleeve and the lower sleeve.

8. The method of claim 7, further comprising forming a protective coating on the internal surface.

* * * * *